United States Patent [19]

Klopfenstein

[11] Patent Number: 4,722,719

[45] Date of Patent: Feb. 2, 1988

[54] ADJUSTABLE BELT DRIVE MECHANISM

[75] Inventor: Wayne A. Klopfenstein, Peoria, Ill.

[73] Assignee: Caterpillar Inc., Peoria, Ill.

[21] Appl. No.: 938,108

[22] Filed: Dec. 4, 1986

[51] Int. Cl.[4] .............................................. F16H 11/04

[52] U.S. Cl. ........................................ 474/28; 474/29; 474/18

[58] Field of Search .................................... 474/28–31, 474/17–19, 11–12, 69–70

[56] References Cited

U.S. PATENT DOCUMENTS

| | | | |
|---|---|---|---|
| 1,483,959 | 2/1924 | Welch | 474/31 X |
| 3,102,431 | 9/1903 | Maurer | 474/29 X |
| 3,376,760 | 4/1968 | Gordanier | 474/35 X |
| 3,596,528 | 8/1971 | Dittrich | 474/12 |
| 3,625,079 | 12/1971 | Hoff | 474/12 |
| 3,722,308 | 3/1973 | Stever | 474/19 |
| 3,924,480 | 12/1975 | Carapellucci | 474/29 X |
| 4,173,155 | 11/1979 | Togami | 474/19 |
| 4,292,031 | 9/1981 | Rattunde | 474/28 X |
| 4,494,943 | 1/1985 | Takei et al. | 474/28 |
| 4,541,820 | 9/1985 | Sakakibara | 474/17 |
| 4,541,821 | 9/1985 | Sakakibara | 474/17 |
| 4,650,442 | 3/1987 | Parsons | 474/29 |

OTHER PUBLICATIONS

SAE Publication No. 720708, dated Sep. 11–14, 1972, by: L. R. Oliver and D. D. Henderson.

SAE Publication No. 720709, dated Sep. 11–14, 1972, by: D. L. Keller and R. E. Wilson.

*Primary Examiner*—Stephen J. Novosad

*Assistant Examiner*—Thuy M. Bui

*Attorney, Agent, or Firm*—Charles E. Lanchantin, Jr.

[57] ABSTRACT

A compact and rugged belt drive mechanism includes a hydraulically controlled actuator located generally between first and second variable pulley assemblies individually having a movable pulley disc and a fixed pulley disc in order to controllably position the movable pulley discs. A drive belt is entrained between the pulley assemblies, and a force-multiplying apparatus including a competitively profiled cam with oppositely inclined ramps and a plurality of roller members engaging the cam serves to automatically adjust tension on the drive belt. The force-multiplying apparatus and an associated plurality of compression springs for applying a preload against the drive belt are operatively associated with only one of the movable pulley discs for simplicity. The belt drive mechanism is particularly useful for steering a vehicle and is disclosed elevational above a differential gear unit for controllably transferring power between the opposite output shafts of the differential gear unit in response to movement of an actuating member of the actuator.

40 Claims, 6 Drawing Figures

44
194
135
232
138
242
78
158
76
150
148
152
166
154
46
176
52
133
130
128
80
230
228
88
126
90
86
104
94
296
82
294
92
100
124
98
106
110
102
96
84
122
112
108
116
114
120
118
48
158
140
12
42
72
154
146
74
156
142
144
60
50
58

ADJUSTABLE BELT DRIVE MECHANISM

TECHNICAL FIELD

This invention relates to a mechanism for transferring power between a pair of variable pulley assemblies having a belt entrained therebetween, and more particularly to a mechanism for controllably moving the movable pulley discs thereof for bidirectionally transferring power at the desired belt tension.

BACKGROUND ART

Variable speed belt drives are being considered more seriously for new applications in the vehicle industry because a new generation of belts is available. These belts are rated for higher power and so can be used in a belt driven transmission for an automobile, snowmobile or other vehicle as the main transmission. Because these belt drives are infinitely variable within a particular range they can make an ideal transmission.

Although the newest generation of belts can handle surprising speeds and power, there can be a substantial amount of heat generated by the contact of the belts with the pulley discs when the variable speed belt drive experiences large variations in torque under dynamically changing conditions. In order to minimize belt slip, for example, relatively high contact pressures between the sides of the belt and the pulley discs are often resorted to on an almost continuous basis. But this undesirably increases belt tension and lowers the service life thereof.

Variable speed belt drives for steering a vehicle have also been proposed, but most of these have incorporated separate drive belts and relatively unsophisticated and/or impractical adjustable belt drive mechanisms for each side of the vehicle. U.S. Pat. No. 1,483,959 issued to L. C. Welch on Feb. 19, 1924 appears to be an exception to such duplicated and costly drive belt mechanisms by disclosing a system for steering a vehicle utilizing a single belt for transferring power between the axle shafts extending from the opposite sides of a standard differential gear assembly. Unfortunately, the shallow-angle, adjustable belt drive mechanism shown in that patent makes no provision for clamping the belt as a function of torque or for accommodating changes in the effective center distance of the belt, and has undesirable interrupted surfaces of the pulley discs. As a result, it is theorized that such mechanism would be inefficient and generally impractical for the intended purpose.

The belt drive industry has long recognized the need for automatically adjusting the clamping forces imposed on the belt by the pulley discs and/or for adjusting the belt tension as a function of the load being transmitted by the belt. For example, reference is made to the torque sensing belt drives shown in SAE Paper No. 720708 authored by L. R. Oliver and D. D. Henderson on or about Sept. 11–14, 1972 and in SAE Paper No. 720709 authored by D. L. Keller and R. E. Wilson on or about that same date. One of the pulley assemblies in these drives is equipped with a belt tensioning device including a helical cam incorporated into the axially sliding flange or pulley disc, a cooperating follower attached to the other flange, and a relatively light compression spring. With high loads belt tension is increased to avoid slippage, and with low loads belt tension is reduced for maximizing belt life. Unfortunately, these drives are limited to a single direction of rotation of the input. Another mechanism is disclosed in U.S. Pat. No. 3,625,079 issued to S. J. Hoff on Dec. 7, 1971. That patent has a normally open, speed-responsive driver pulley assembly and a normally closed, torque-responsive driven pulley utilizing a helical cam and a torsion spring. That drive mechanism, for a mini bike, is undesirably unidirectional and is not directly responsive primarily to the torque level being transmitted by the belt because of the speed responsive portion.

U.S. Pat. No. 4,173,155 issued to P. G. Togami et al on Nov. 6, 1979 shows driving and driven pulley assemblies for driving a rotor shaft in a single direction of rotation and included a torque sensing mechanical cam. The movable pulley disc associated with the cam undesirably can rotate relative to the fixed pulley disc so that only half of the total torque load on the belt passes through the cam.

U.S Pat. Nos. 4,541,820 and 4,541,821 issued to S. Sakakibara on Sept. 17, 1985 illustrate several V-belt and pulley type transmissions using a cam mechanism for urging one of the movable pulley discs toward one of the stationary pulley discs and clamping the belt as a function of torque. However, these transmissions function unidirectionally and undesirably incorporate various servo-mechanisms which add excessive control complexity and expense.

Accordingly, what is desired is an efficient, rugged and low cost adjustable belt drive mechanism for controllably transferring power between two variable pulley assemblies in either direction of rotation, for coordinating the movement of the movable pulley discs, and for simultaneously clamping the belt as a function of the load on the belt. The drive mechanism should include a simple and reliable hydraulically actuated device for axially positioning at least one of the movable pulley discs in order to change the reduction ratio thereof, and an effective mechanical means for adjusting the tension of the belt as a function of torque in order to avoid slip and to extend the service life of the belt. Moreover, the mechanism should be so constructed and arranged as to allow the elements of the pulley assemblies to rotate freely, to slide easily in the axial direction, and to transmit relatively high loads while exhibiting a minimum of distortion or tendency to cock. Preferably, the belt drive mechanism should be specifically constructed to bidirectionally distribute substantial amounts of power between the axle shafts of a vehicle such as a track-type tractor for steering purposes and to have an extended service life under adverse field conditions.

DISCLOSURE OF THE INVENTION

The present invention is directed to overcoming one or more of the above problems.

In one aspect of the present invention there is provided an adjustable belt drive mechanism for controllably transferring power between first and second parallel shafts respectively having first and second pulley assemblies thereon and with each pulley assembly including a fixed pulley disc and a movable pulley disc. Advantageously, a double-acting fluid actuator is disposed generally between the shafts for forcibly closing one of the pulley assemblies while allowing the remaining one to open.

In accordance with another aspect of the present invention, there is provided a first variable pulley assembly including a first fixed pulley disc, a first movable pulley disc, and a first shaft disposed on a first axis, a second variable pulley assembly including a second fixed pulley disc, a second movable pulley disc, and a second shaft disposed on a second axis, a belt connecting the pulley assemblies, and actuator means for urging one of the movable pulley discs towards the fixed pulley disc associated therewith. The actuator means beneficially includes a double-acting fluid actuator having a stationary support post and an actuating member movably mounted on the post on a third axis parallel to the first and second axes and generally therebetween.

Preferably, the actuator means includes tensioning means for mechanically clampingly engaging the movable pulley disc of the first pulley assembly against the belt as a bidirectional function of the torque being transmitted by the belt. The tensioning means is used in conjunction solely with the first pulley assembly and includes a mechanical force-multiplying apparatus having a repetitively double-ramped cam element, a plurality of rollers in contact with the cam element for urging the first movable pulley disc toward the first fixed pulley disc, and a preloading device for continually urging the first movable pulley disc toward the first fixed pulley disc and providing an initial squeezing action against the sides of the belt.

Furthermore, the belt drive mechanism of the present invention is illustrated in conjunction with a differential gear unit and pair of axle shafts of a vehicle for the purpose of steering the vehicle in a relatively simple, reliable and efficient manner. A hydraulic control system controllably delivers fluid to the double-acting actuator of the belt drive mechanism in response to manual movement of a steering wheel or the like.

BEST MODE FOR CARRYING OUT THE INVENTION

Figure 1:
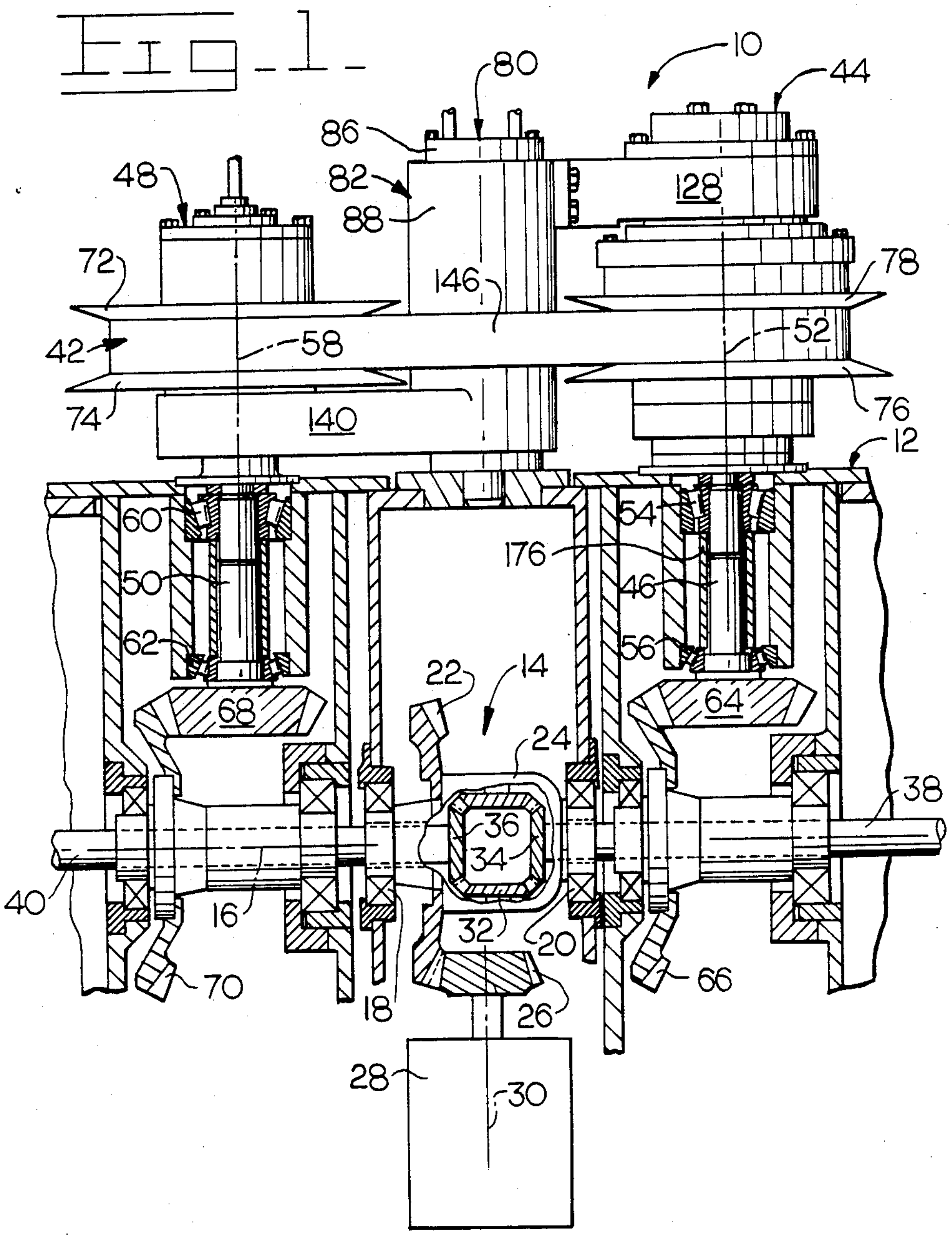
FIG. 1 is a diagrammatic elevational view of the adjustable belt drive mechanism of the present invention as connected between the opposite axle shafts of a vehicle having a differential gear unit therebetween with portions shown in cross section or broken open to better illustrate details thereof.

As shown in FIG. 1, a vehicle 10 has a differential housing 12 and a conventional differential gear unit 14 supported for rotation in the housing along a horizontal and transversely oriented central axis 16 by a pair of conventional bearing assemblies 18 and 20. The differential gear unit includes an input bevel ring gear 22 releasably connected to an input carrier 24, and which is normally driven by a bevel pinion gear 26. The bevel pinion gear is driven by a multi-speed transmission 28 of the usual type along a horizontal and longitudinally oriented axis 30, although the axis has been rotated approximately 90° in FIG. 1 for illustrative convenience. A plurality of spider gears 32 are mounted within the carrier 24 of the differential gear unit and are individually intermeshed with right and left side gears 34 and 36 respectively. The side gears are connected to rotate respectively with a right axle shaft 38 and a left axle shaft 40 also arranged along the central axis 16.

An adjustable belt drive mechanism 42 constructed in accordance with the present invention controllably transfers power between the right and left axle shafts 38 and 40 for steering of the vehicle 10. For this purpose the belt drive mechanism includes a first or right pulley assembly 44 operatively associated with a first shaft 46, and a second or left pulley assembly 48 operatively associated with a second shaft 50. The right shaft 46 is supported for rotation about a first vertical axis 52 by a pair of elevationally spaced tapered roller bearing assemblies 54 and 56 mounted in the housing 12. In a similar manner the left shaft 50 is supported for rotation about a second vertical axis 58 by a pair of tapered roller bearing assemblies 60 and 62. A first bevel pinion gear 64 is connected to the lower extremity of the first shaft 46 and is disposed in intermeshing engagement with a bevel ring gear 66 connected to rotate with the right axle shaft 38. A second bevel pinion gear 68 is connected to the lower extremity of the second shaft 50 and engaged with a bevel ring gear 70 connected to rotate with the left axle shaft 40.

Figure 2:
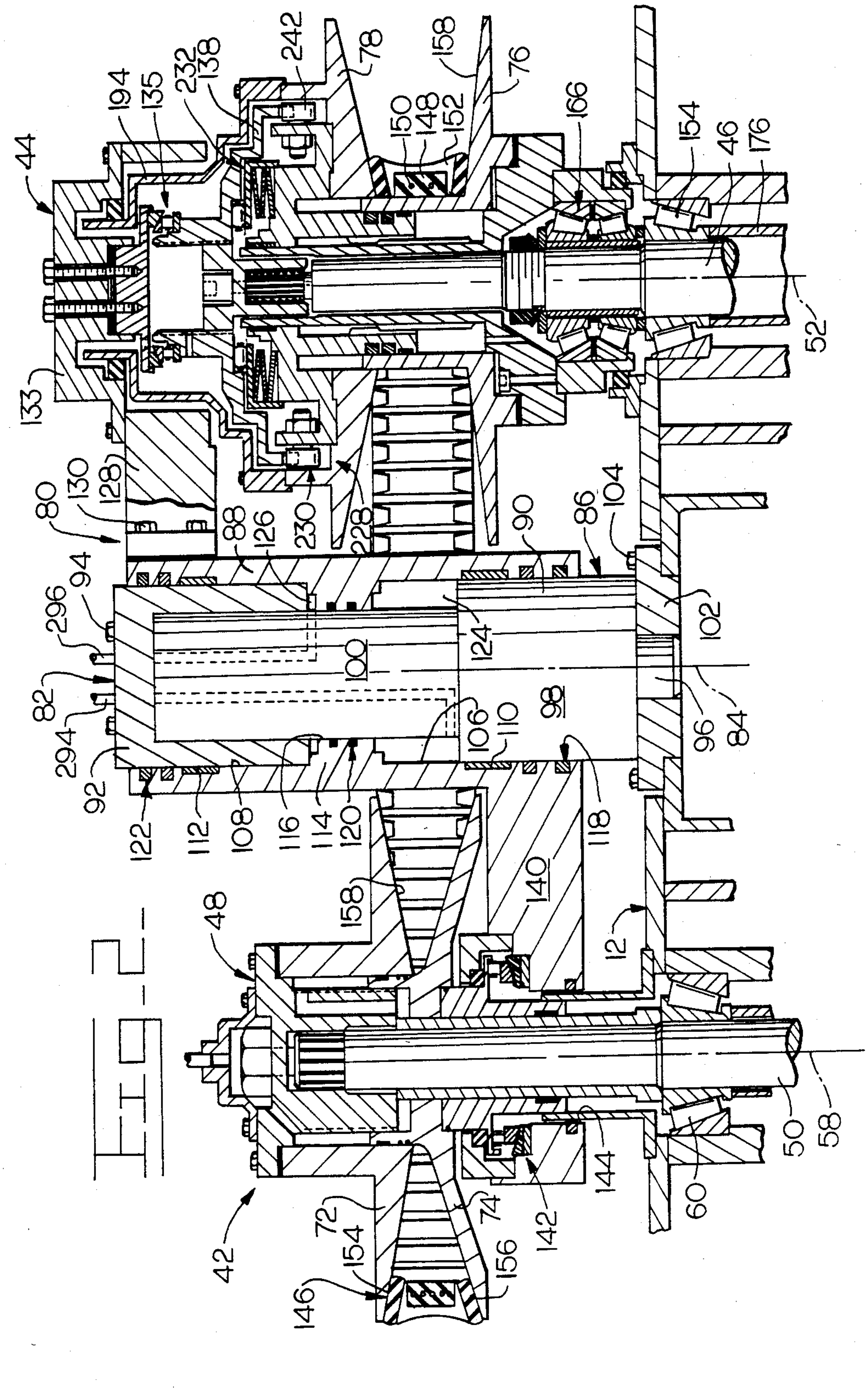
FIG. 2 is an enlarged cross sectional and elevational view of the belt drive mechanism of FIG. 1 showing a double-acting fluid actuator and the variable pulley assemblies associated therewith.
Figure 3:
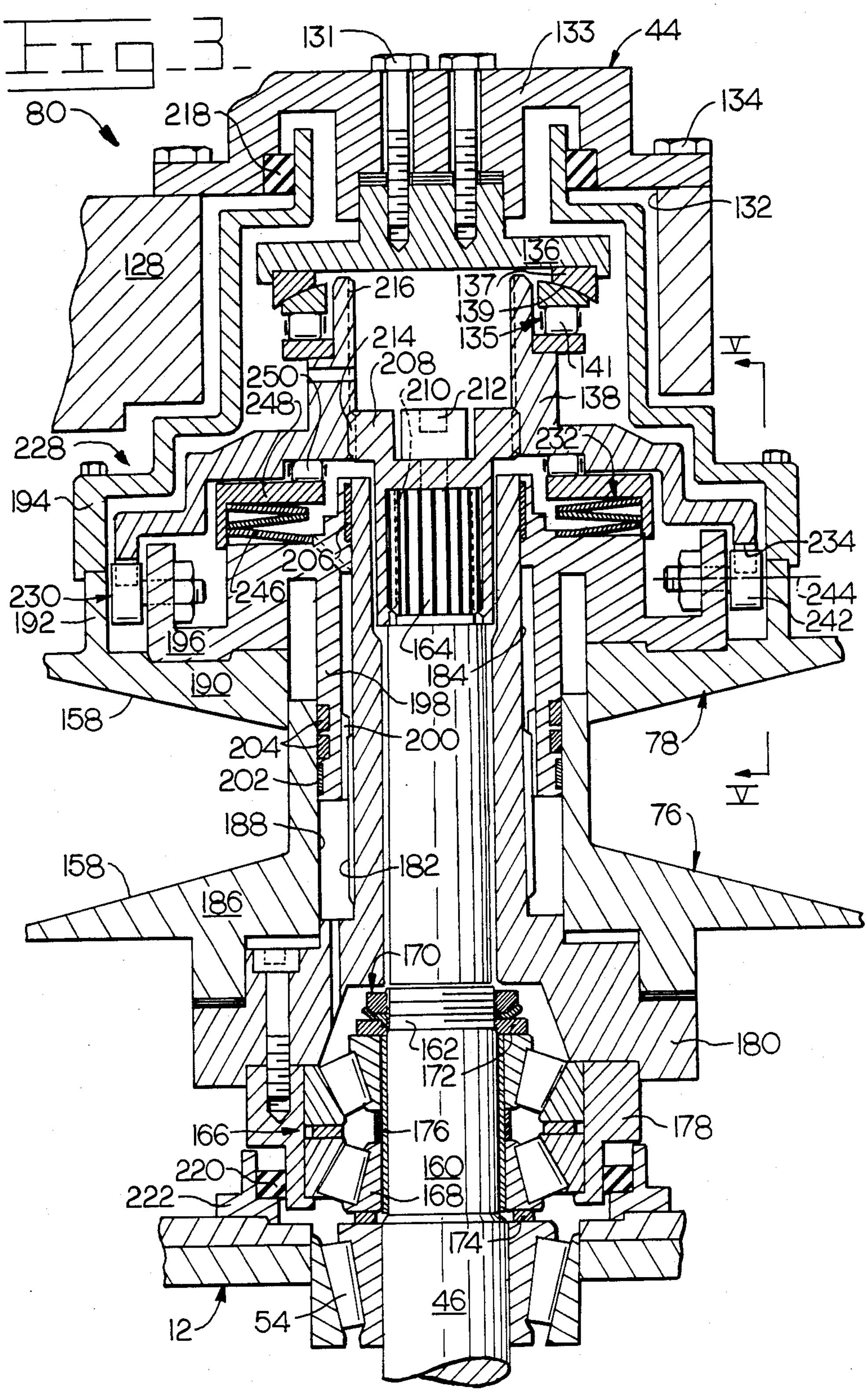
FIG. 3 is a fragmentary and further enlarged elevational view of the first or right pulley assembly of FIGS. 1 and 2 showing details of construction thereof.
Figure 4:
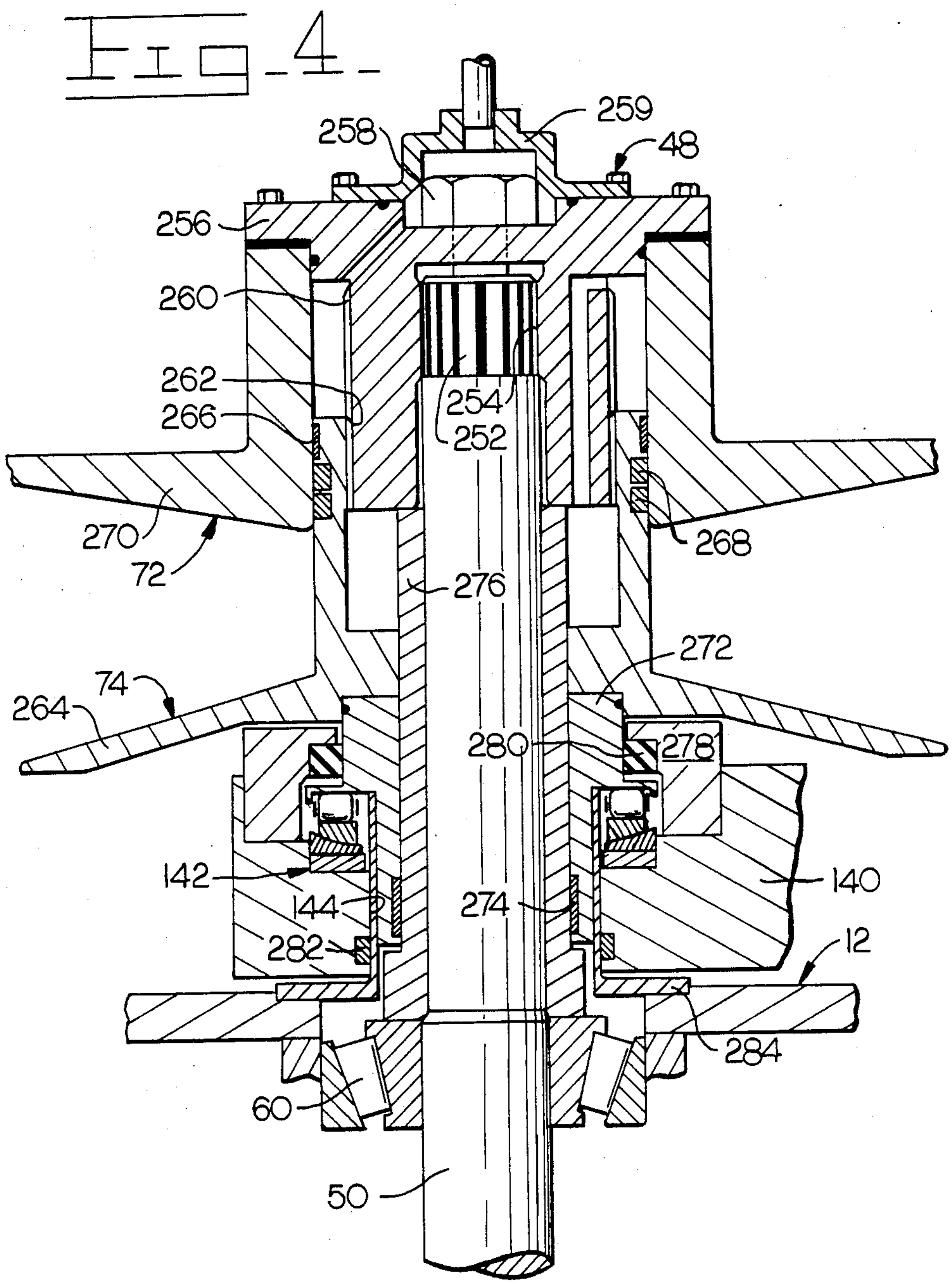
FIG. 4 is a fragmentary and further enlarged elevational view of the second or left pulley assembly of FIGS. 1 and 2.

Referring now to FIGS. 2 and 4, the left pulley assembly 48 may be noted to include an upper axially fixed pulley disc or side plate 72 releasably and rigidly secured to the second shaft 50 for conjoint rotation, and a lower axially movable pulley disc or side plate 74 indirectly secured to rotate with the second shaft. The right pulley assembly 44 illustrated in FIGS. 2 and 3 diametrically oppositely includes a lower axially fixed pulley disc or side plate 76 indirectly releasably secured to the first shaft 46 and limitedly rotatably mounted with respect thereto. At the upper portion of the right pulley assembly 44 is an axially movable pulley disc 78 also indirectly secured to the first shaft and limitedly rotatably mounted with respect thereto.

In accordance with a major feature of the present invention, and as is shown best in FIG. 2, actuator means 80 is provided for hydraulically forcibly closing one of the pulley assemblies 44 and 48 and allowing the other pulley assembly to open. More specifically, the actuator means includes a double-acting fluid actuator 82 disposed generally between the shafts 46 and 50 on an axis 84 parallel to the axes 52 and 58. The actuator includes a two-piece stationary support post 86 and a generally tubular piston or actuating member 88 mounted on the support post for reciprocal movement along the axis 84. The lower part of the support post consists of a multi-stepped cylindrical body 90 while the upper part consists of a cylindrical cap 92 releasably secured to the body by a plurality of fasteners or bolts 94 screwthreadably received in the body. Defined by the body are a lower cylindrical projection 96, an intermediate relatively large diameter cylindrical head portion 98, and an upper cylindrical stem portion 100 of a smaller diameter than the head portion. Preferably, the lower projection 96 is interlockingly and releasably received in a separate mounting plate 102 which is releasably secured to the top of the differential housing 12 by a plurality of fasteners or bolts 104.

The actuating member 88 of the fluid actuator 82 defines lower and upper cylindrical bores 106 and 108 that contain split bearing sleeves 110 and 112 that slidably engage the stationary cylindrical surfaces of the head portion 98 and the cap 92 respectively. A radially inwardly extending flange 114 within the actuating member defines a central bore 116 which is in a facing relationship to the stem portion 100, and a plurality of axially spaced and annular radial seal assemblies mounted within the actuating member and identified generally by the reference numbers 118, 120 and 122 sealingly engage the support post so as to define therewith a lower actuating chamber 124 and an upper actuating chamber 126.

A first actuator arm 128 extends radially away from the upper part of the actuating member 88 and is preferably releasably secured thereto by a plurality of fasteners or bolts 130. As shown best in FIG. 3, the arm 128 includes a cylindrical bore 132 and an inlet cap 133 releasably secured to the arm by a plurality of fasteners or bolts 134. The arm is operatively associated with the upper right movable pulley disc 78 through a self-aligning thrust bearing assembly 135 seated between a flanged end plate 136 and an annularly-stepped reaction element 138. One or more fasteners 131 releasably secures the cap and the flanged end plate together and allows for adjusting the axial length therebetween for proper loading of the bearing assembly. Preferably, the self-aligning thrust bearing assembly 135 has a pair of spherically mating rings 137 and 139 and a plurality of caged roller bearing elements 141 disposed between one of the rings and the reaction element 138.

A second actuator arm 140 is shown in FIGS. 2 and 4 which extends oppositely radially away from the lower part of the actuating member 88 and is preferably integrally formed therewith. The second actuator arm is directly operatively associated with the lower left movable pulley disc 74 through a self-aligning thrust bearing assembly 142 that is received in a stepped cylindrical bore 144 of the arm, and that is similar to the previously described bearing assembly 135.

As is illustrated in FIG. 2, an endless drive belt 146 of the V-block type is entrained between the first and second pulley assemblies 44 and 48. The drive belt has a flat band 148 of elastomeric or rubber material formed into an endless loop with a plurality of metallic reinforcing cables 150 circumferentially arranged therein, and a plurality of V-blocks 152 are connected to the band at longitudinally spaced intervals. Each of the V-blocks has two inclined elastomeric or plastic side portions 154 and 156 that frictionally engage the generally conical surfaces 158 of the pulley discs 72, 74, 76 and 78. U.S. Pat. Nos. 4,177,687 issued to P. E. Russ, Sr. on Dec. 11, 1979; 4,340,378 issued to P. E. Russ, Sr. on July 20, 1982; and 4,365,965 issued to P. E. Russ, Sr. on Dec. 28, 1982 are representative of this form of preferred belt, although it is to be appreciated that the belt drive mechanism 42 of the present invention can be succesfully used with a wide variety of belt constructions.

Referring now to FIG. 3, the first or right shaft 46 defines a cylindrical portion 160, a threaded portion 162 and an upper external spline 164. An opposed tapered roller bearing assembly 166 having a pair of inner bearing races 168 is mounted generally on the shaft adjacent the cylindrical portion 160 for rotatably supporting the lower right pulley disc 76 in a fixed axial location. A nut and lock assembly 170 mounted on the threaded portion 162 of the shaft axially contains the inner races between an upper bearing spacer 172 and a lower bearing spacer 174 and in axial thrust bearing engagement with the inner race of the tapered roller bearing assembly 54. A spacer sleeve 176 supports the inner bearing races 168 on the cylindrical portion 160 of the shaft.

The lower right pulley disc 76 has a bearing retainer member 178, and an axially fixed lower hub 180 releasably connected to the retainer member and defining a lower external spline 182 and an upper cylindrical outer surface 184. A sheave portion 186 is releasably connected to the hub and defines a cylindrical bore 188 and one of the external conical surfaces 158 for engaging the drive belt 146.

The upper right pulley disc 78 has a sheave portion 190 having an upstanding tubular wall 192, and a hollow multi-stepped cover 194 is releasably connected to the tubular wall. And the sheave portion 190 is releasably secured to an axially movable upper hub 196 defining a depending tubular wall 198 and a lower internal spline 200 on the wall which is in slip fitting engagement with the external spline 182 of the lower hub 180. A lower split plastic sleeve bearing 202 and a pair of seal rings 204 are mounted exteriorly on the wall 198 for guiding and sliding engagement with the bore 188 of the sheave portion 186, and an upper split plastic sleeve bearing 206 is mounted interiorly of the upper hub 196 for guiding and sliding engagement with the outer surface 184 of the lower hub 180.

A shaft extension 208 having an internal spline 210 engaged with the external spline 164 on the shaft 46 is releasably secured to the shaft by a conventional fastener or socket headed bolt 212. The shaft extension has an external spline 214 which is adapted to engage an internal spline 216 on the reaction element 138 and this defines a slip fit spline joint. At the top of the pulley assembly 44 is a conventional seal ring 218 mounted within the inlet cap 133 and radially engaging the reduced diameter periphery of the cover 194. At the bottom is a similar seal ring 220 which is seated within an adapter ring 222 secured to the housing 12 and radially engaging the bearing retainer member 178.

Figure 5:
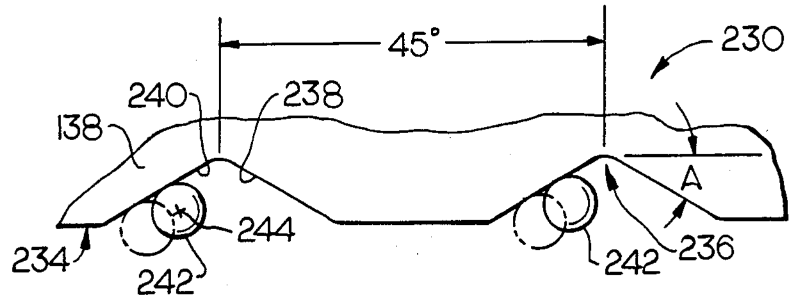
FIG. 5 is a fragmentary, enlarged and developed elevational view of a force-multiplying apparatus forming a part of the belt drive mechanism of the present invention as taken generally along line V—V in FIG. 3.

In accordance with one feature of the present invention, and as shown best in FIG. 3, the actuator means 80 includes belt tensioning means 228 solely associated with the first pulley assembly 44 for clampingly engaging the movable pulley disc 78 against the drive belt 146 as a bidirectional function of the torque being transmitted by the belt. Particularly, the tensioning means 228 includes a mechanical force-multiplying apparatus 230 and a mechanical preload means 232. The force-multiplying apparatus includes a downwardly facing annular cam 234 defined by the outer periphery of the reaction element 138. The developed profile of the repetitively contoured cam is partially illustrated in FIG. 5 and is defined by a plurality of similar recesses 236 individually having a substantially linear or flat first inclined ramp 238 on one side and a substantially linear or flat second inclined ramp 240 on the other. In the instant example there are eight equally spaced apart recesses and the angl of inclination is approximately 27° as indicated by the angle A in the drawing. The preferred range for the angle A is from 10° to 35°, with the greater angle being less aggressive and providing a reduced clamping force on the belt. The force-multiplying apparatus further includes a plurality of equally peripherally spaced roller members or wheels 242 mounted on the hub for rotation about a corresponding plurality of horizontal axes 244 arranged in radially intersecting relation to the axis 52. Each of the roller members is received within one set of the oppositely inclined ramps or within one of the cam recesses, and is adapted to engage one of the ramps in accordance with the direction of torque transfer.

The preload means 232 functions to continually mechanically urge the sheave portion 190 downwardly when viewing FIG. 3 and against the drive belt 146 so that the drive belt is, in effect, squeezed between the conical surfaces 158 of the sheave portions 186 and 190 with a preselected initial force. For this purpose the preload means includes a plurality of Belleville compression springs 246 arranged in a stack seated between the hub 196 and an annular spring retainer 248. A roller thrust bearing assembly 250 is connected between the spring retainer and the reaction element 138 to permit relative rotation therebetween.

The left or second pulley assembly 48 illustrated in FIG. 4 is simpler in construction than the first pulley assembly 44 because no tensioning means is associated therewith. The upper end of the second shaft 50 defines an external spline 252 which is engaged with an internal spline 254 defined by a cap 256. A fastener or bolt 258 releasably secures the cap to the shaft, and an inlet cover 259 is releasably secured to the cap in a manner to prevent loosening of the bolt by retaining the head thereof. The cap defines an external spline 260 which is engaged with an internal spline 262 formed within a sheave portion 264 of the lower movable pulley disc 74. Thus the pulley discs 72 and 74 are connected for joint rotation by this slip fit spline joint. A split plastic sleeve bearing 266 and a pair of seal rings 268 are mounted peripherally on the sheave portion 264 for radial engagement with a sheave portion 270 of the upper fixed pulley disc 72. A movable hub 272 is releasably secured to the lower sheave portion 264 and engages the self-aligning thrust bearing assembly 142. A split plastic sleeve bearing 274 is mounted within the hub and engages the periphery of an elongate tubular spacer member 276 that encircles the shaft. The spacer member 276 is disposed in axial load transferring relation between the cap 256 and the inner race of the tapered roller bearing assembly 60. A seal retainer 278 is releasably secured to the second actuator arm 140 and contains a conventional seal ring 280 which radially engages the hub 272. Another seal ring 282 within the bore 144 of the actuator arm 140 is radially engaged against a flanged sleeve 284 releasably secured to the top of the differential housing 12.

Figure 6:
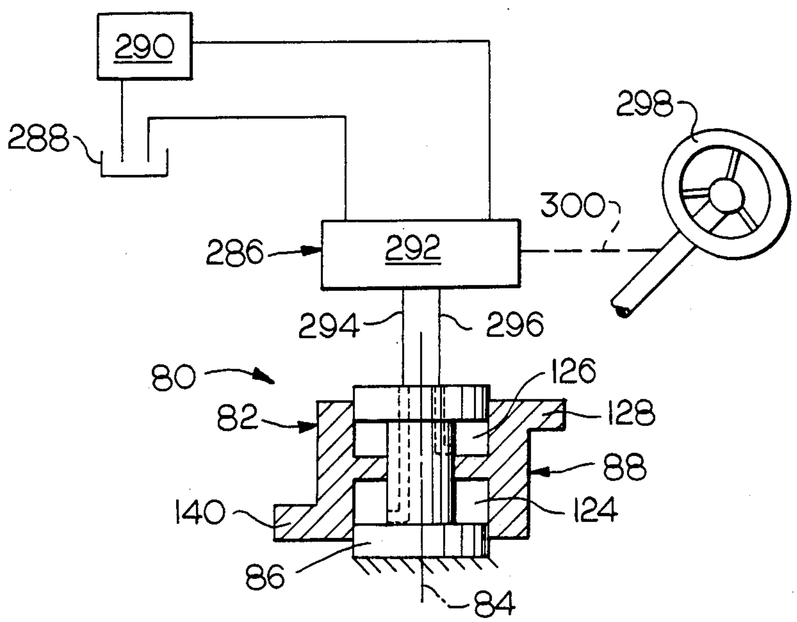
FIG. 6 is a diagrammatic view of a hydraulic steering control system used for controllably delivering fluid to the fluid actuator shown in FIG. 2.

Referring now to FIG. 6, the actuator means 80 for closing and opening the pulley assemblies 44 and 48 includes a hydraulic control system 286 for controllably directing fluid to one of the actuating chambers 124 and 126 of the fluid actuator 82 and exhausting the other chamber to a reservoir 288. A source of pressurized fluid 290 at a preselected and relatively constant pressure level is delivered to a conventional hand metering unit or steering valve 292. The hand metering unit is essentially a small hydraulic pump that is used as a metering and directional valve. It controllably directs fluid to one of the passages 294 and 296 and controllably exhausts fluid from the remaining passage leading to the actuating chambers 124 and 126 through the support post 86. The hand metering unit 292 functions to do this in response to rotation of an associated steering wheel 298 via an intermediate mechanical drive connection 300 as representatively shown in broken lines.

Industrial Applicability

In operation, the transmission 28 of the vehicle 10 is driven at a selected speed, and causes rotation of the longitudinally oriented bevel pinion gear 26 and the transversely oriented bevel ring gear 22 shown in FIG. 1. This rotates the differential carrier 24 so as to normally drive the side gears 34 and 36 of the differential gear unit 14 at the same speed and in the same direction through the intermediate spider gears 32 in a well known manner when the steering wheel 298 shown in FIG. 6 is positioned in the central or neutral position. At one particular transmission speed, for example, the axle shafts 38 and 40 can be driven at approximately 1,042 revolutions per minute (rpm) by these side gears. This results in the same speed ratio increase between the bevel ring gears 66 and 70 and their respective bevel pinion gears 64 and 68 so that the first pulley shaft 46 and the second pulley shaft 50 are each driven at approximately 2,320 rpm in the same directional sense. It is significant to appreciate that the drive belt 146 normally operates to transfer no torque under these conditions, if it is assumed that the final drive losses and conditions between the ground engaging drive members and the earth are the same at both sides of the vehicle. In the straight-ahead mode of operation, the facing pairs of pulley discs 72 and 74, and 76 and 78 are spaced apart the same distance and have a preselected effective operating diameter with respect to the drive belt. Simultaneously, the preload means 232 shown in FIG. 3 is effective to provide a preselected tension level of approximately 1157 Newtons (260 pound-force) to the drive belt by continuously urging the upper right pulley disc 78 toward the axially fixed lower right pulley disc 76. All of the roller members 242 are in contact with the inclined ramps 240 as is shown in phantom lines in FIG. 5, or alternatively are in contact with the opposite inclined ramps 238 as a function of the torque direction therethrough. Under some ground conditions, torque could be transmitted by the drive belt between the pulley assemblies 44 and 48, in which case the roller members would travel along the ramps away from the recesses 236 with increasing torque.

Assuming that it is desired to steer the vehicle 10 to the left, the steering wheel 298 is rotated by the operator to cause the hand metering unit 292 to controllably deliver fluid at a relatively moderate pressure level, for example about 3450 kPa (500 psi), to the lower actuating chamber 124 of the fluid actuator 82 and to controllably exhaust fluid from the upper actuating chamber 126 at a pressure lower than that pressure. This causes upward movement of the actuating member 88 on the support post 86 and raising of the first and second actuator arms 128 and 140. This results in upward movement of the lower left movable pulley disc 74 through the self-aligning thrust bearing assembly 142 a certain axial distance and an increase in the effective diameter of the second pulley assembly 48. The diagonally opposite upper right movable pulley disc 78 would normally simultaneously move upwardly an amount greater than the certain axial movement distance established at the second pulley assembly because of the construction of the belt tensioning means 228. Specifically, the drive belt 146 forces the upper right pulley disc 78 upwardly and increases the torque transfer level to the first shaft 46. This results in the roller members 242 effectively traveling toward the recesses 236 on the inclined ramps 240 or, for example, from the phantom line positions illustrated in FIG. 5 to the solid line positions shown for this rotational direction of torque transfer. The compression springs 246 of the preload means 232 shown in FIG. 3 are simultaneously compressed in axial height. Nevertheless, the force-multiplying apparatus 230 mechanically increases clamping of the drive belt between the pulley discs 76 and 78 with increasing torque by forcing the roller members 242 from the solid line positions back toward the phantom line positions with a force-multiplying action that is a function of the torque being transmitted by the belt. Accordingly, the belt tension increases with increased torque transfer, with the right pulley assembly 44 opening up while the belt tensioning means 228 effectively provides an overriding increase in the effective diameter thereof. The belt tension during this condition could rise to approximately 3,865 Newtons (869 pound-force), for example. The left pulley shaft 50 could ideally slow down to a speed of 1,424 rpm, with the left pulley assembly 48 applying torque and becoming the driver. The right pulley shaft 52 could ideally rotate faster to a speed of 3,216 rpm, with the right pulley assembly 44 being driven by the belt. The slip spline joint at the mating splines 214 and 216 shown in FIG. 3 permits axial movement of the reaction element 138 relative to the axially fixed shaft 46. The slip spline joint at the splines 182 and 200 assures that the pulley discs 76 and 78 will rotate at the same speed. The slip spline joint at the splines 260 and 262 shown in FIG. 4 simultaneously assures that the pulley discs 72 and 74 will rotate together.

When the steering wheel 298 is stationary in the neutral position there is substantially no fluid flow in the passages 294 and 296 leading to the actuating chambers 124 and 126. When the steering wheel is turned to the left by the operator there can be an increase in the pressure to the lower chamber 124 to about 6,210 kPa (900 psi) or even higher, while the upper chamber 126 is controllably exhausted to the reservoir 288 at a substantially lower pressure. If there is a slow rotation of the steering wheel there will be a small increase in volume of fluid to the actuating chamber and a relatively slow turn rate increase. Turning the steering wheel faster will result in a greater volume and a faster turn rate increase.

In view of the foregoing, it is apparent that the hydraulic-over-mechanical belt drive mechanism 42 of the present invention is particularly useful for steering a vehicle such as a track-type tractor or the like where torque loads up to 475 Newton Meters (350 lb. ft.) can be anticipated during normal operation. It has a rugged double-acting hydraulic actuator 82 located generally between the variable pulley assemblies 44 and 48 for effecting movement of the diametrically opposite movable pulley discs 74 and 78 and changing the effective diameters thereof to controllably deliver power between the pulley shafts 46 and 50 via the drive belt 146. It advantageously provides automatic tensioning of the belt to avoid belt slip by responding to applied torque loads through the action of the belt tensioning means 228 including the mechanical force-multiplying apparatus 230 and the preload means 232 which are located solely in association with the movable pulley disc 78 of one of the pulley assemblies. As the roller members 242 travel circumferentially away from the recesses 236 on the double-acting inclined ramps 238 or 240, a significant increase in clamping force is achieved against the sides of the drive belt with but a limited degree of travel. The construction of the torque-sensing cam 234, including the relatively generous diameter thereof, the precise angle of the inclined ramps and the number of sets of the ramps and cooperating roller members is extremely important to the overall success of its operation. Use of the cam-following roller members also eliminates sliding friction contact problems inherent with other types of constructions. One of the features also contributing to the smooth response and repeatability of the tension loads of the instant drive mechanism is the relatively widely axially spaced sleeve bearings 202 and 206 on the first pulley assembly 44 as shown in FIG. 3 and the sleeve bearings 266 and 274 on the second pulley assembly 48 as shown in FIG. 4 which tend to minimize cocking of the associated elements. Another of the features involves the incorporation of the self-aligning thrust bearing assemblies 136 and 142 which allows for the deflection of the actuator arms 128 and 140 and deflection of the shafts 46 and 50 under dynamic conditions so as to make more uniform the thrust loads about the circumference of the roller bearing elements 141 and 250. The various seal rings serve to maintain lubricating fluid within the pulley assemblies to enhance rotary and sliding movement of the elements while excluding deleterious foreign material.

Other aspects, objects and advantages of this invention can be obtained from a study of the drawings, the disclosure, and the appended claims.

I claim:

1. An adjustable belt drive mechanism for controllably transferring power between first and second parallel shafts respectively having first and second variable pulley assemblies thereon, each pulley assembly having a fixed pulley disc and a movable pulley disc, and a belt connecting the pulley assemblies, comprising:

actuator means for forcibly closing one of the pulley assemblies and allowing the other pulley assembly to open, the actuator means including a single double-acting fluid actuator disposed generally between the shafts and tensioning means for clampingly engaging the movable pulley disc of the first pulley assembly against the belt as a function of the torque being transmitted by the belt to and from the second pulley assembly, the tensioning means including a mechanical force-multiplying apparatus having a repetitively contoured cam and a plurality of roller members in rolling contact with the cam.

2. An adjustable belt drive mechanism for steering a vehicle having a differential unit and oppositely extending output members, connected to the differential unit, comprising:

first and second variable pulley assemblies operatively associated with first and second shafts respectively, each pulley assembly having a fixed pulley disc and a movable pulley disc;

a drive belt connecting the pulley assemblies;

gear means for connecting the first and second shafts to the respective output members; and actuator means for hydraulically forcibly closing one of the movable pulley discs and allowing the remaining movable pulley disc to open, the actuator means including a single double-acting fluid actuator.

3. The belt drive mechanism of claim 1 wherein the tensioning means is operatively associated solely with the first pulley assembly.

4. The belt drive mechanism of claim 2 wherein the actuator means includes tensioning means solely associated with the first pulley assembly for clampingly engaging the first movable pulley disc axially against the drive belt as a bidirectional function of the torque being transmitted by the drive belt.

5. The belt drive mechanism of claim 1 wherein the cam is connected to rotate conjointly with the first shaft and includes a plurality of recesses defined by a plurality of oppositely inclined ramps, one of the roller members being disposed generally in each of the recesses in rolling engagement with one of the ramps.

6. The belt drive mechanism of claim 1 wherein the tensioning means includes a preload means for continually urging the movable pulley disc of the first pulley assembly toward the fixed pulley disc.

7. The belt drive mechanism of claim 1 wherein the fluid actuator includes a stationary support post and a generally tubular actuating member mounted on the support post and defining therewith first and second actuating chambers, and the actuator means includes first and second actuator arms connected to the actuating member and a self-aligning thrust bearing asssembly between each of the actuator arms and the respective movable pulley disc.

8. The belt drive mechanism of claim 4 wherein the tensioning means includes an annular and repetitively profiled cam defining a plurality of oppositely inclined pairs of ramps, and a plurality of roller members individually adapted to roll on a pair of the ramps.

9. The belt drive mechanism of claim 8 wherein the tensioning means includes preload means for continually mechanically urging the first movable pulley disc toward the first fixed pulley disc.

10. The belt drive mechanism of claim 7 wherein the actuator means includes a vehicle steering wheel, a metering unit operated by the steering wheel, and means for hydraulically communicating the metering unit with the respective actuating chambers and controllably moving the actuating member on the support post.

11. The belt drive mechanism of claim 2 wherein the actuator means includes a steering wheel and valve means for controllably delivering fluid to the fluid actuator in response to rotation of the steering wheel.

12. The belt drive mechanism of claim 1 wherein the cam includes a plurality of recesses defined by a plurality of oppositely inclined ramps, one of the roller members being disposed generally in each of the recesses.

13. The belt drive mechanism of claim 12 including preload means for continually urging the first movable pulley disc against the belt.

14. The belt drive mechanism of claim 1 including a differential gear unit having a first output member operatively connected to the first shaft, a second output member operatively connected to the second shaft, and a driven input member.

15. The belt drive mechanism of claim 14 wherein the first and second output members are connected to axle shafts of a vehicle, and the fluid actuator is operable to adjust the pulley assemblies so as to transfer torque between the axle shafts via the belt and to thereby accelerate one of the axle shafts and to decelerate the other at the same magnitude for steering of the vehicle.

16. The belt drive mechanism of claim 15 wherein the parallel shafts and the fluid actuator have vertical axes.

17. The belt drive mechanism of claim 1 wherein the actuator includes a movable actuating member, and the actuator means includes a reaction element defining the contoured can and adapted to move substantially axially with the actuating member in juxtaposed relation to the first movable pulley disc, and means for connecting the reaction element to the first shaft for joint rotation with axial sliding freedom therebetween.

18. The belt drive mechanism of claim 11 wherein the fluid actuator has a support member and an actuating member axially movably mounted thereon, the actuating member having a first arm operatively associated with the first movable pulley disc and a second arm operatively associated with the second movable pulley disc.

19. The belt drive mechanism of claim 17 wherein the actuator means includes preload means for continually urging the first movable pulley disc axially toward the belt.

20. The belt drive mechanism of claim 19 wherein the preload means includes a plurality of compression springs and a thrust bearing assembly connected between the reaction element and the first movable pulley disc.

21. The belt drive mechanism of claim 17 wherein the cam includes a plurality of recesses defined by oppositely inclined ramps, and the roller members are individually adapted to be located in one of the recesses and against one of the ramps.

22. An adjustable belt drive mechanism comprising:
- a first variable pulley assembly including a first fixed pulley disc, a first movable pulley disc, and a first shaft having a first axis;
- a second variable pulley assembly including a second fixed pulley disc, a second movable pulley disc, and a second shaft having a second axis;
- a belt connecting the pulley assemblies; and
- actuator means for forcibly urging one of the movable pulley discs towards the fixed pulley disc associated therewith while allowing coordinated movement of the remaining movable pulley disc, the actuator means including a double-acting fluid actuator having a stationary support post and an actuating member movably mounted on the post on a third axes parallel to the first and second axes and interposed generally therebetween, and including a pressurized fluid source, a metering unit connected to the pressure source, a steering wheel connected to the metering unit, and means for communicating the metering unit with the fluid actuator and effecting movement of the actuating member in response to rotation of the steering wheel.

23. The belt drive mechanism of claim 22 wherein the actuator means includes a reaction element connected to move with the actuating member, a double-acting cam associated with one of the reaction element and the first movable pulley disc, and a plurality of roller members mounted on the remaining one of the reaction element and the first movable pulley disc and engaged with the cam.

24. The belt drive mechanism of claim 23 wherein the actuator means includes preload means for continually urging the first movable pulley disc against the belt.

25. The belt drive mechanism of claim 24 wherein the actuator means includes a slip spline joint between the reaction element and the first shaft.

26. The belt drive mechanism of claim 22 wherein the actuator means includes a pair of axially spaced apart sleeve bearings for guiding the first movable pulley disc with respect to the first fixed pulley disc.

27. The belt drive mechanism of claim 22 wherein the actuator means includes a first sleeve bearing for guiding the second movable pulley disc with respect to the second fixed pulley disc, and a second sleeve bearing for guiding the second movable pulley disc with respect to the second shaft.

28. The belt drive mechanism of claim 22 wherein the actuator means includes preload means for continually mechanically urging the first movable pulley disc against the belt and force-multiplying means for mechanically urging the first movable pulley against the belt as a function of torque being transmitted by the belt in either direction.

29. The belt drive mechanism of claim 22 including a differential gear unit having an input member, opposite output members, and gear means for connecting the first and second shafts to the opposite output members.

30. The belt drive mechanism of claim 22 wherein the first fixed pulley disc and first movable pulley disc are coupled together for joint rotation and for limited rotation with respect to the first shaft.

31. The belt drive mechanism of claim 30 wherein the second fixed pulley disc, second movable pulley disc, and second shaft are coupled together for joint rotation.

32. An adjustable belt drive mechanism for controllably transferring power between a first pulley assembly having a first fixed pulley disc and a first movable pulley disc and a second variable pulley assembly having a second fixed pulley disc and a second movable pulley disc, and with a drive belt connecting the pulley assemblies, comprising:

the first pulley assembly including a reaction element in facing relation to the first movable pulley disc; and actuator means for hydraulically effecting axial movement of the reaction element and adjusting the effective diameter of the first pulley assembly, the actuator means including a mechanical force-multiplying apparatus for clampingly engaging the first movable pulley disc against the belt as a bidirectional function of the torque transmitted by the belt, the force-multiplying apparatus including a repetitively profiled cam defining a plurality of sets of oppositely inclined ramps and a roller member for contacting each set of the ramps, the cam being connected to one of the reaction element and the first movable pulley disc and the roller member being connected to the remaining one.

33. The belt drive mechanism of claim 32 wherein the actuator means includes preload means for continually mechanically urging the first movable pulley disc toward the belt and imparting an initial clamping force thereon.

34. The belt drive mechanism of claim 33 wherein the preload means includes a plurality of compression springs.

35. The belt drive mechanism of claim 34 wherein the preload means includes a thrust bearing assembly intermediate the reaction element and the springs.

36. The belt drive mechanism of claim 32 wherein the first pulley assembly has a shaft and a slip spline joint interconnecting the shaft and the reaction element and allowing relative axial motion therebetween.

37. The belt drive mechanism of claim 32 wherein the actuator means includes a hydraulically movable arm and a bearing assembly serially connected to the reaction element.

38. The belt drive mechanism of claim 37 wherein the bearing assembly is a self-aligning thrust bearing assembly.

39. The belt drive mechanism of claim 32 wherein the first fixed pulley disc and first movable pulley disc are coupled together for joint rotation.

40. The belt drive mechanism of claim 39 including a pair of sleeve bearings for guiding the first movable pulley disc with respect to the first fixed pulley disc.

* * * * *